United States Patent [19]

Schäfer et al.

[11] 4,161,911

[45] Jul. 24, 1979

[54] PRESSES FOR BALING WASTE MATERIALS

[75] Inventors: Anton Schäfer, Langenfeld; Karl Probst, Solingen, both of Fed. Rep. of Germany

[73] Assignee: Lindemann Maschinenfabrik GmbH, Dusseldorf, Fed. Rep. of Germany

[21] Appl. No.: 817,678

[22] Filed: Jul. 21, 1977

[30] Foreign Application Priority Data

Aug. 14, 1976 [DE] Fed. Rep. of Germany ....... 2636742

[51] Int. Cl.² .............................................. B30B 15/30

[52] U.S. Cl. ....................................... 100/96; 100/189

[58] Field of Search ..................... 100/215, 94, 96, 95, 100/97, 179, 188, 189

[56] References Cited

U.S. PATENT DOCUMENTS

| | | | |
|---|---|---|---|
| 947,375 | 1/1910 | Corning | 100/96 |
| 2,068,886 | 1/1937 | MacDonald | 100/96 X |
| 2,691,338 | 10/1954 | Robbins | 100/97 |

FOREIGN PATENT DOCUMENTS

| | | | |
|---|---|---|---|
| 2504059 | 8/1976 | Fed. Rep. of Germany | 100/97 |

*Primary Examiner*—Billy J. Wilhite

*Attorney, Agent, or Firm*—Toren, McGeady and Stanger

[57] ABSTRACT

A baling press for pressing waste materials such as refuse into bales comprises a pressing box, a filler shaft for feeding waste material to be pressed from above into the pressing box and a plunger having a driving mechanism for moving it laterally into the pressing box to press material in the box. An inclined material inlet chute leads into the filler shaft and a material preparation device for loosening or separating the waste material is provided at the bottom of the chute; the preparation device comprises a rotor having shredding teeth for engaging waste material from the chute and the rotor is mounted to rotate about a stationary horizontal axis which extends across the bottom of the chute. The rotor is driven in a direction such that the shredding teeth of the rotor move upwardly adjacent the chute. Preferably the chute is adjustable in position to enable it to be moved bodily or to be pivoted upwards and downwards so that the position at which an imaginary extension of the chute intersects the rotor can be adjusted.

10 Claims, 5 Drawing Figures

PRESSES FOR BALING WASTE MATERIALS

This invention relates to baling presses for pressing waste material such as refuse into bales, the press comprising a pressing box, a filler shaft for feeding waste material to be pressed from above into the pressing box and a plunger having a driving mechanism for moving it laterally into the pressing box to press material in the box. It is particularly concerned with material preparation devices in such presses for loosening or separating the waste material before it is fed to the pressing boxes of such presses.

An existing form of preparation device, which will be described in more detail later consists basically of a centrifuge plate, which revolves about a vertical axis in the filler shaft and upon which an upwardly pointing distributor cone is centrally mounted.

The quality of the bales produced in such presses depends to a very great extend upon the state of the waste material, which as is well known can vary considerably in the case of refuse. Thus, for example, waste paper is sometimes supplied in a very loose form having a low bulk density, but refuse also comes in the form of materials which have a high bulk density and are difficult to press.

The types of waste paper which present no difficulty in compressing and in the quality of the bales produced therefrom include corrugated paper and cardboard of all types, warehouse and department store waste and mixed types of paper. These materials have low bulk density and are therefore easily compressed, so that bales with a good expansion capability result. This expansion capability is of basic importance for the quality of the bales, because the bales are banded and the banding is held tight by the reexpansion of the material in the bale so that the bales remain stable in shape and suitable for transportation and stacking.

Difficulties arise with those types of waste paper that possess high bulk density, such as newspapers, periodicals, documents and files, magazines and the like, frequently in bundled form. Unless preparatory measures are adopted, the bales made from such materials suffer from the particularly serious disadvantage that, due to the almost complete lack of expansion capability, for instance periodicals in layers can barely be compacted any further, the banding of the bales remains insufficiently tight, so that the necessary stability of form, transportability and stacking capability are lacking.

To overcome these disadvantages, material preparation devices as described above have been incorporated in presses intended for baling such difficult material. With such devices, files and documents, bundles of periodicals and the like fall from above on to the preparation device and a first separating and loosening effect is obtained by the impact on the distributor cone. The impinging material is then flung centrifugally substantially radially outwards by the centrifuge plate and the shredder teeth producing a greater or lesser degree of further disintegration or loosening of the material.

Although the known form of device has without doubt provided an improvement in the operation of bale presses, it suffers from certain disadvantages, which in particular interfere with the smooth flow of the waste material. The material preparation device, being disposed in the filler shaft, forms a cross-sectional constriction, which leaves clear only a part of the filler shaft cross-section as a passage for filling the pressing box. This leads to comparatively long filling times, resulting in a reduction in bale output over a period of time. Any attempt to attain the highest possible output performance frequently leads with such devices to excess feeding and thus overloading of the preparation device, so that the desired degree of loosening is no longer attained. The processing of inadequately prepared material leads as already explained to an inferior quality of bale, which frequently no longer justifies the additional expenditure associated with the provision of a material preparation device.

A further disadvantage arises from the combination of the material preparation device which is round in the plane of the cross-section of the filler shaft with the polygonal, and usually rectangular cross-section of shaft. This causes a portion of the material supplied from above to arrive in the pressing box via the corner regions of the filler shaft, without being at all affected by the material preparation device. In the case of compactly bundled material, this leads to an adverse influence upon the quality of bale.

Materials delivered in loosened form with a low bulk density, such as corrugated paper or cardboard, can only be processed if the filler shaft is free from obstructing components, since otherwise bridging and clogging will occur in the filler shaft. The abovementioned preparation device must therefore be constructed so that it can be swung out of the shaft and must be swung every time the type of material fed to the press changes. This results in an interruption of the pressing operation, which leads to a further reduction in output performance.

The aim of the present invention is to provide a baling press with a material preparation device which does not possess the disadvantages of the known device, and which can remain in its position regardless of the type of material supplied to the press and nevertheless reliably seizes and loosens materials of high bulk density, whilst leaving problem-free materials of lower bulk density largely uninfluenced.

According to this invention, a baling press for pressing waste material such as refuse, into bales, which comprises a pressing box, a filler shaft for feeding waste material to be pressed from above into the pressing box and a plunger having a driving mechanism for moving it laterally into the pressing box to press material in the box, is provided with an inclined material inlet chute which leads into the filler shaft and a material preparation device for loosening or separating the waste material is provided at the bottom of the chute, the preparation device comprising a rotor having means for engaging waste material from the chute, the rotor being mounted to rotate about a stationary substantially horizontal axis extending across the bottom of the chute, and a driving mechanism which is arranged to rotate the rotor in a direction such that the rotor moves upwardly adjacent the chute.

By these measures, the result is attained that, without the previous requirement that the preparation device shall be capable of swinging out of the shaft, the processing of materials differing in their bulk density and even of mixed materials is possible with an unimpeded filler shaft cross-section, a uniformly good bale quality being attained.

In an advantageous embodiment, the inlet chute is incorporated in the filler shaft and the filler shaft has a closed top and a side inlet opening leading to the chute. Due to the resultant position of the material preparation device, offset from the filler shaft axis, constriction of the filler shaft cross-section and consequent reduction in output of the bale press is avoided. Materials of high bulk density, e.g., bundled newspaper packets or telephone directories move because of their weight down the inlet chute and come into contact with the upwardly revolving side of the rotor, are seized by its engagement means and are loosened and thrown against the top of the filler shaft and/or one of the filler shaft walls. The thus loosened material falls uniformly distributed across the filler shaft cross-section into the pressing box. Materials of lower bulk density, such as cardboard boxes of every type, slide over the rotor into the filler shaft and may be lightly shredded as they pass over the rotor, which has no further effects on the operation of the press or on bale quality.

The proposed measures thus have the effect that material loosened in the desired manner and moreover uniformly loosened is fed, regardless of the quality of the material delivered, into the filler shaft directly above the pressing box, so that an excellent, constant quality of bale is obtained in combination with a high output rate.

In a preferred embodiment of the invention, the rotor extends across the entire width of the bottom of the inlet chute and the means for engaging the waste material are shredder teeth. Since the rotor occupies the entire width of the inlet chute, "dead zones" are avoided, so that all material is seized by the rotor. Moreover, the shredder teeth, because of their stationary path of movement, ensure that not only is a shredding effect exerted but also a high acceleration is imparted to dense material, so that it is flung centrifugally with high kinetic energy against one of the walls of the filler shaft and is thereby further loosened.

An especially high loosening effect is obtained if an extension of the plane of the sliding surface of the bottom part of the chute extends below the axis of rotation of the rotor. This can be attained in a simple manner by providing a substantially semi-cylindrical housing wall which is disposed beneath the rotor and extends between the discharge edge of the bottom of the inlet chute and an adjacent side wall of the shaft, the semi-cylindrical wall extending partly around the rotor with a clearance from the envelope cylinder described by the shredder teeth as the rotor rotates. The loosening effect is high because, with this arrangement, the supplied material is thrown by the rotor of the preparation device principally against the top of the filler shaft and is then reflected from the latter a number of times into the region of the rotor before it is thrown against the wall opposite to the inlet opening and thus settles in the pressing box of the baling press thoroughly loosened and partly coarsely disintegrated.

If the inlet chute is adjustable in position, the higher the sliding plane of the bottom part of the chute penetrates the envelope cylinder from bottom to top, the greater will be the draw-in effect exerted upon the supplied material towards the filler shaft by the rotor. The material will be thrown less towards the shaft top and predominantly to the wall opposite to the filler opening and thereby shredded and loosened. A degree of loosening which is completely satisfactory for the already mentioned quality of bale and a good draw-in effect can be obtained if the chute is at least in part adjustable between a first position in which an extension of the plane of the sliding surface of the bottom of the chute is tangential to and below the envelope cylinder described by the rotor as the rotor rotates and a second position in which the said extension intersects the top of the said envelope cylinder along a line, in which a vertical plane containing the axis of rotation of the rotor intersects the top of the said envelope cylinder. The degree of loosening and disintegration of the material being prepared is thus made adjustable. This is of importance for the further processing of the material to be pressed into bales.

According to a further embodiment of the invention, the inlet chute is angularly adjustable in inclination. In this way the aforementioned adjustment of the inlet chute with respect to the material preparation device can be attained advantageously in a simple, reliable and economical manner.

The inlet chute may comprise an upper fixed part and a lower part which is angularly adjustable in inclination relative to the upper part. This form of construction enables the lower region of the inlet chute to be inclined more steeply than the upper region, thus causing materials of low bulk density, such as cardboard, to meet the rotor in a plane which is an extension of the upper part of the inlet chute, that is towards the top of the rotor, whereas materials of high bulk density meet the rotor near the middle of its height. This has the advantageous result that the materials of low bulk density, which require hardly any loosening action, are only lightly shredded, loosened and further conveyed by the material preparation device, while the materials of greater bulk density, which require more preparation, are intensively treated in the already described manner and are loosened up, before they arrive in the pressing box of the baling press.

As another alternative, the inlet chute may be rectilinearly adjustable in a direction at right angles to its sliding face. This construction of the inlet chute also, with the objective of varying the degree of loosening, is advantageous, simple and inexpensive.

Some examples of baling presses in accordance with the invention will now be described with reference to the accompanying drawings, in which.

Figure 1:
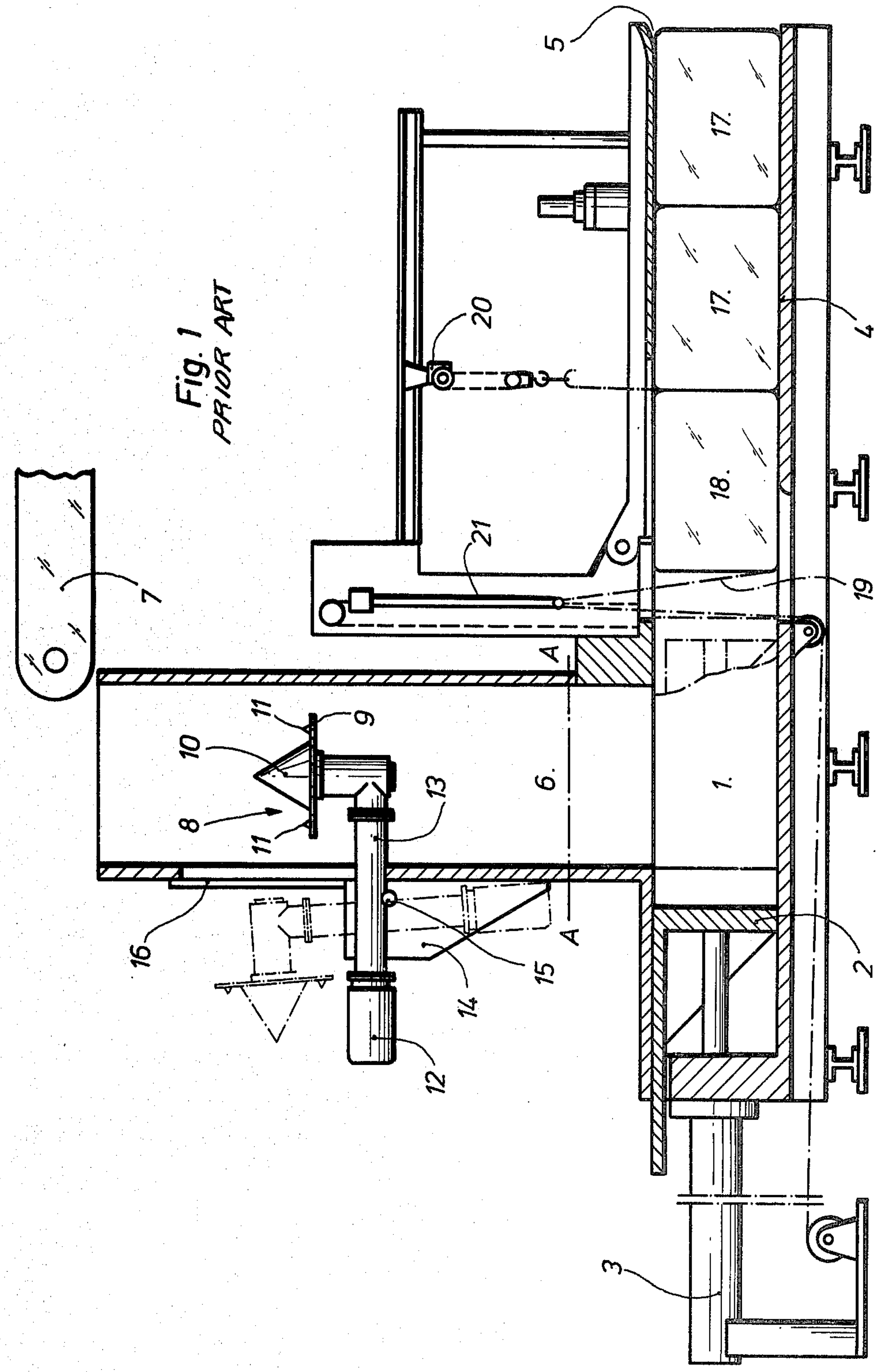
Fig. 1 PRIOR ART
FIG. 1 is a vertical sectional view of a baling press comprising an existing form of material feeding device in a filler shaft of the press.

An existing form of feeding device is explained first in connection with FIG. 1. The device is incorporated in a baling press which comprises a pressing box 1, a pressing plunger 2 and plunger drive 3. The pressing box 1 is adjoined by a pressing duct 4, the cross-section of which tapers slightly from the pressing box 1 to an outlet opening 5. At least one wall of the pressing duct 4 is adjustable in inclination to enable the taper to be adjusted. A filler shaft 6, through which the material to be pressed falls under gravity from a conveyor belt 7 leading to the top of the shaft. A material preparation device 8 is pivotally mounted so that it can be swung into the filler shaft 6. The preparation device 8 comprises a centrifuge plate 9 which is rotated about a vertical axis, and upon which a distributor cone 10 pointing against the flow of material is centrally mounted. A number of shredder teeth 11 are distributed around the centrifuge plate 9, near its edge. The centrifuge plate 9 is driven at high speed by a motor 12 through a transmission housed in a cranked tube 13. The material preparation device 8 is mounted so that it can swing out about a hinge 15 attached to a bracket 14. To enable the device 8 to be swung out of the shaft 6, a lateral opening, closable by a cover 16, is provided in one wall of the filler shaft 6.

To form a bale 17 in the pressing duct 4, a number of strokes of the pressing plunger 2 are required. At each stroke, the bales 17 already situated in the pressing duct 4 are pushed forward. Two of such already finished bales 17 are shown in FIG. 1. These bales have already been banded, while a third bale 18 is shown just being banded. For the purpose of banding the bales, a wire 19, a horizontally travelling crab 20 and a vertically movable banding needle 21 are used. The drives of the crab and of the banding needle are not shown. Details of the known banding operation are not of importance to this invention and will therefore not be described further.

Figure 2:
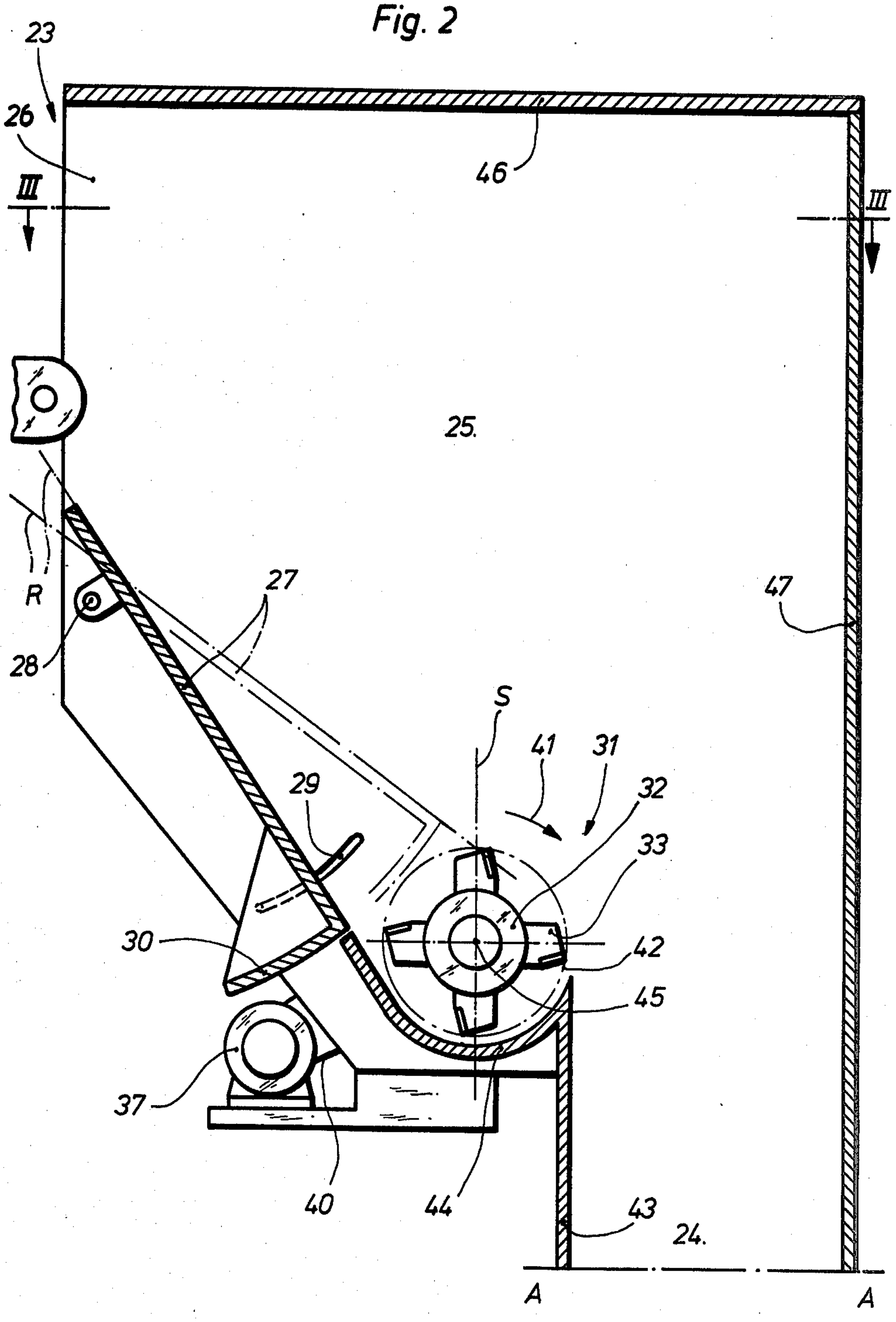
FIG. 2 is a vertical sectional view of one example of a material feeding device according to this invention for a baling press.

In FIG. 2, illustration of parts of the baling press already described in relation to FIG. 1 and not altered, is dispensed with for simplicity. It is to be understood that the material feed shown in FIG. 2 joins on to a baling press as shown in FIG. 1 approximately in the plane A—A.

Figure 3:
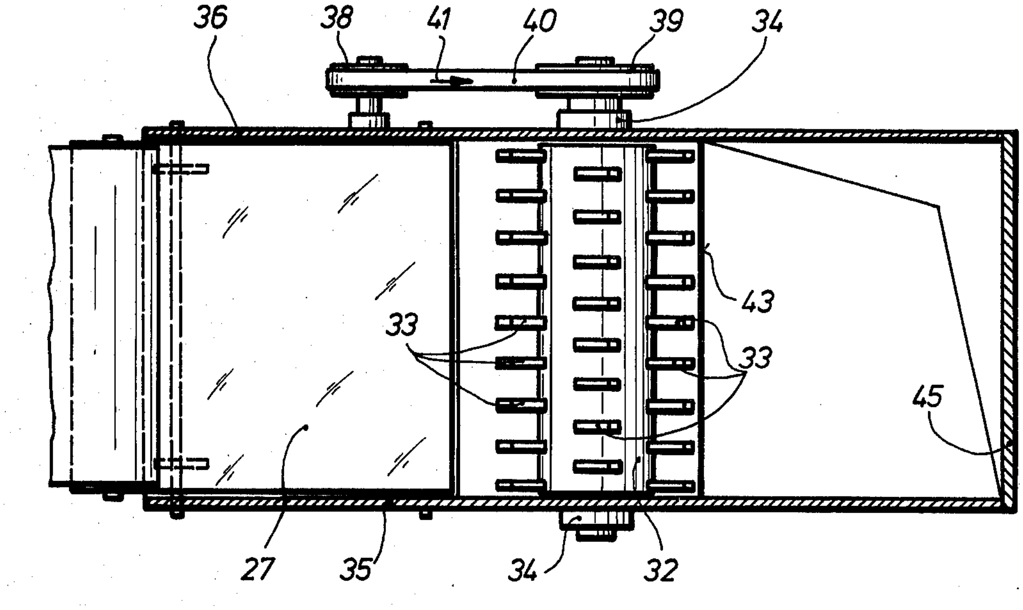
FIG. 3 is a section along the line III—III in FIG. 2.

A filler shaft 23 consists of a lower, vertical shaft portion 24 of uniform, preferably rectangular, cross-section. This is adjoined above by a spacious, roofed chamber 25 comprising a lateral feed opening 26. From the lower side of the feed opening 26 an inclined material inlet chute 27 extends to the filler shaft 24, this chute being adjustable in inclination about an axis 28 into a position shown in chain-dotted lines and being capable of being fixed to the lateral walls of the filler shaft 23 in any position in which it is set. Elongated holes 29 permit this fixing. In the raised positions, a cover plate 30 prevents the material sliding down the chute from escaping outwards. Between the shaft portion 24 and the inlet chute 27, a material preparation device 31 is disposed. This device comprises a rotor 32, extending across the entire width of the chute 27, and having on its periphery fixed shredder teeth 33. As shown in FIG. 3, the rotor 32 is rotatably mounted in bearings 34, which are fixed to lateral walls 35 and 36 of the chamber 25. A motor 37 drives the rotor 32, via belt pulleys 38 and 39 and a driving belt 40, in the direction of an arrow 41, so that the rotor revolves upwardly on its material inlet side. The tips of the shredder teeth 33 as shown in FIG. 2 pass along the surface of an envelope cylinder 42.

Between the inlet chute 27 and a lateral wall 43 of the shaft portion 24, an approximately semi-cylindrical housing wall 44 is provided. This surrounds the envelope cylinder 42 with a small clearance. Counter-tools for the shredder teeth 33 are intentionally not provided, since the material preparation device is intended primarily not for producing a disintegrating effect, but for obtaining a loosening effect that is to separate agglomerations of pieces of the material being fed.

In the position of the inlet chute 27 illustrated in full lines in FIG. 2, a feed plane R formed by the inlet chute extends to below the material preparation device, passing close to the envelope cylinder 42 and touching tangentially the semi-cylindrical housing wall 44. In the position shown in chain-dotted lines, the feed plane R intersects the line, in which a vertical plane S passing through the axis of rotation 45 of the rotor 32 intersects the top of the envelope cylinder 42. At positions in this region, the supplied material is satisfactorily loosened up in the manner necessary for forming bales, the degree of loosening varying. In the full-line position, the materials are predominantly thrown against the filler shaft roof 46, from which they are reflected probably several times into the region of the material preparation device 31, before they strike the filler shaft wall 47 and then fall into the pressing box of the baling press. The materials are thus intensively treated, so that a high degree of loosening, with possibly some disintegration as well, resulting.

At positions of the inlet chute 27, in which the materials meet the material preparation device 31 in the upper region, for example as shown in chain-dotted lines in FIG. 2, they are seized by the shredder teeth 33 and are thrown predominantly against the filler shaft wall 47, undergoing comparatively little mechanical treatment but falling into the pressing box of the baling press loosened to a satisfactory extent.

Figure 4:
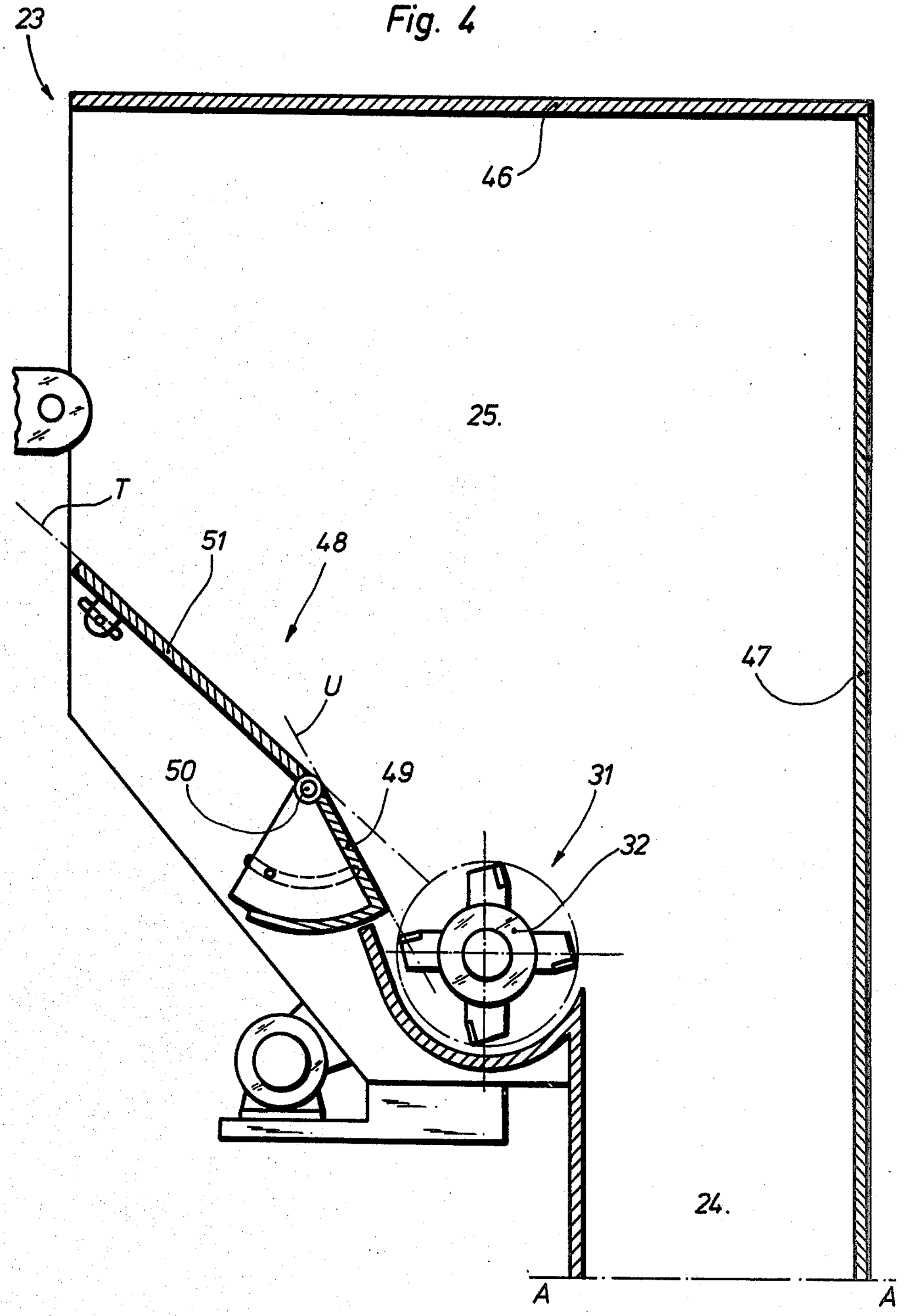
FIGS. 4 and 5 are other embodiments of the material feeder.

In the example shown in FIG. 4, a 2-part inlet chute 48 is provided. A lower part 49 of the chute is connected to the upper part 51 by a hinge 50 permitting angular adjustment only of the lower part, while the upper part 51 remains in one position, corresponding approximately to a middle position of the chute shown in FIG. 2. The lower part 49 is angularly adjustable in a range corresponding to the adjustment range of the inlet chute 27 of FIG. 2. The objective and advantages of this inlet chute are just the same as those of the example of FIG. 2.

Figure 5:
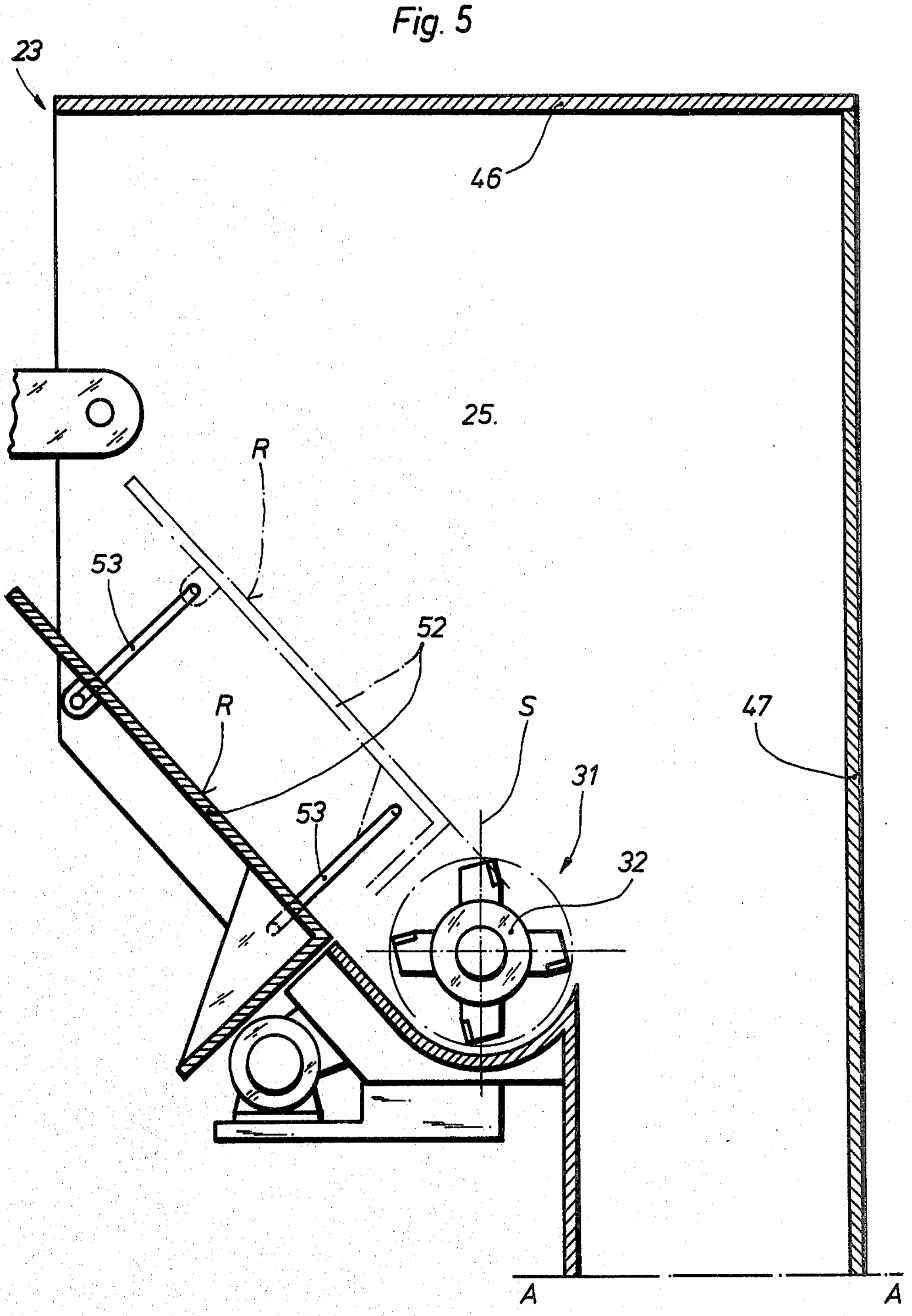

FIG. 5 illustrates a third example comprising an inlet chute 52, which can be adjusted in position rectilinearly in a direction at right angles to its sliding face by means of elongated holes 53 in the lateral walls of the filler shaft 23. The chute 52 corresponds in its function to the inlet chute 27, FIG. 2, except for the difference that in every position it has the same angle of inclination.

In practice, it is not often necessary to adjust the inlet chute 27, 48, 52. It is adjusted and secured during commissioning of the baling press, taking account of the degree of loosening desired by the nature of the bales required and the nature of the material to be pressed. It has been found that this setting is completely satisfactory for the materials such as waste paper and refuse, which are principally to be expected.

The chamber 25 has a height and a width in a direction at right angles to the axis 45 corresponding to several times the diameter of the envelope cylinder 42, so that the material which expands abruptly due to the loosening effect can be accepted without difficulty. The material preparation device automatically satisfies the requirement of loosening materials of low bulk density only slightly and materials of higher bulk densities more drastically, so that bales are obtained which satisfy the initially described technical requirements.

We claim:

1. A baling press for processing waste materials such as refuse into bales comprising: a pressing box; a filler shaft connected to said pressing box including a shaft portion for feeding waste material to be pressed from above into said box; a plunger slideably mounted in said box; a driving mechanism for moving said plunger to press waste in said box; an inclined material inlet chute located within said filler shaft through which waste material may be introduced into said baling press; and a material preparation device located to receive material introduced through said inclined inlet chute for treating said incoming material; said preparation device including a rotor, means mounting said rotor for rotation about a substantially horizontal axis extending across the bottom of said inclined chute, means on said rotor for engaging waste material from said chute and drive means for rotatively driving said rotor in a given direction; said rotor being arranged at a location between the bottom of said inclined inlet chute and the inlet of said shaft portion, with said inclined inlet chute on one side of said rotor; said given direction of rotation of said rotor being such that as said rotor rotates said one side of said rotor on which said inlet chute is located travels in a generally upwardly directed rotary path to propel material incoming from said chute over and above said rotor before said material reaches said shaft portion.

2. A press as claimed in claim 1, further comprising means mounting said chute in said filler shaft, means closing the top of said shaft, and means defining a laterally directed inlet opening in a side of said shaft, said inlet opening leading to the top of said chute.

3. A press as claimed in claim 1, wherein said rotor extends across the entire width of the bottom of said chute and said means for engaging said waste material consists of shredder teeth mounted on said rotor.

4. A press as claimed in claim 3, further comprising a substantially semi-cylindrical housing wall beneath said rotor, said wall extending from the bottom of said chute to an adjacent wall of said shaft, said semi-cylindrical wall extending partly around said rotor with a clearance from an envelope cylinder described by said shredder teeth as said rotor is rotated by said drive means.

5. A press as claimed in claim 1, wherein said chute includes means defining a sliding surface and an extension of the plane of the bottom part of said sliding surface extends below said axis of rotation of said rotor.

6. A press as claimed in claim 1, further comprising means adjustably mounting at least part of said chute, means defining a sliding surface of said at least part of said chute, said means adjustably mounting said at least part of said chute allowing said at least part of said chute to be adjusted between a first position in which an extension of the plane of said sliding surface is tangential to and below an envelope cylinder described by said rotor as said rotor is rotated by said drive means and a second position in which said extension intersects the top of said envelope cylinder along a line in which a vertical plane containing said axis of rotation of said rotor intersects the top of said envelope cylinder.

7. A press as claimed in claim 1, further comprising means mounting said inlet chute for angular adjustment to adjust the inclination of said chute thereby to enable varying of the degree of loosening of said material by said material preparation device.

8. A press as claimed in claim 1, wherein said inlet chute comprises an upper part, means fixedly mounting said upper part, a lower part and means mounting said lower part for angular adjustment in inclination relative to said upper part.

9. A press as claimed in claim 1, further comprising means defining a sliding surface of said chute and means mounting said chute for rectilinear adjustment in position in a direction at right angles to said sliding surface.

10. A press according to claim 1 wherein said shaft portion is located on a side of said rotor opposite said one side on which said inclined inlet chute is located, said inclined inlet chute thereby projecting to said rotor on said one side thereof which faces away from said filler shaft.

* * * * *